March 8, 1938.  R. P. DAUGHERTY ET AL  2,110,790
GROUND PULVERIZING MACHINE
Filed Dec. 18, 1936  3 Sheets-Sheet 2

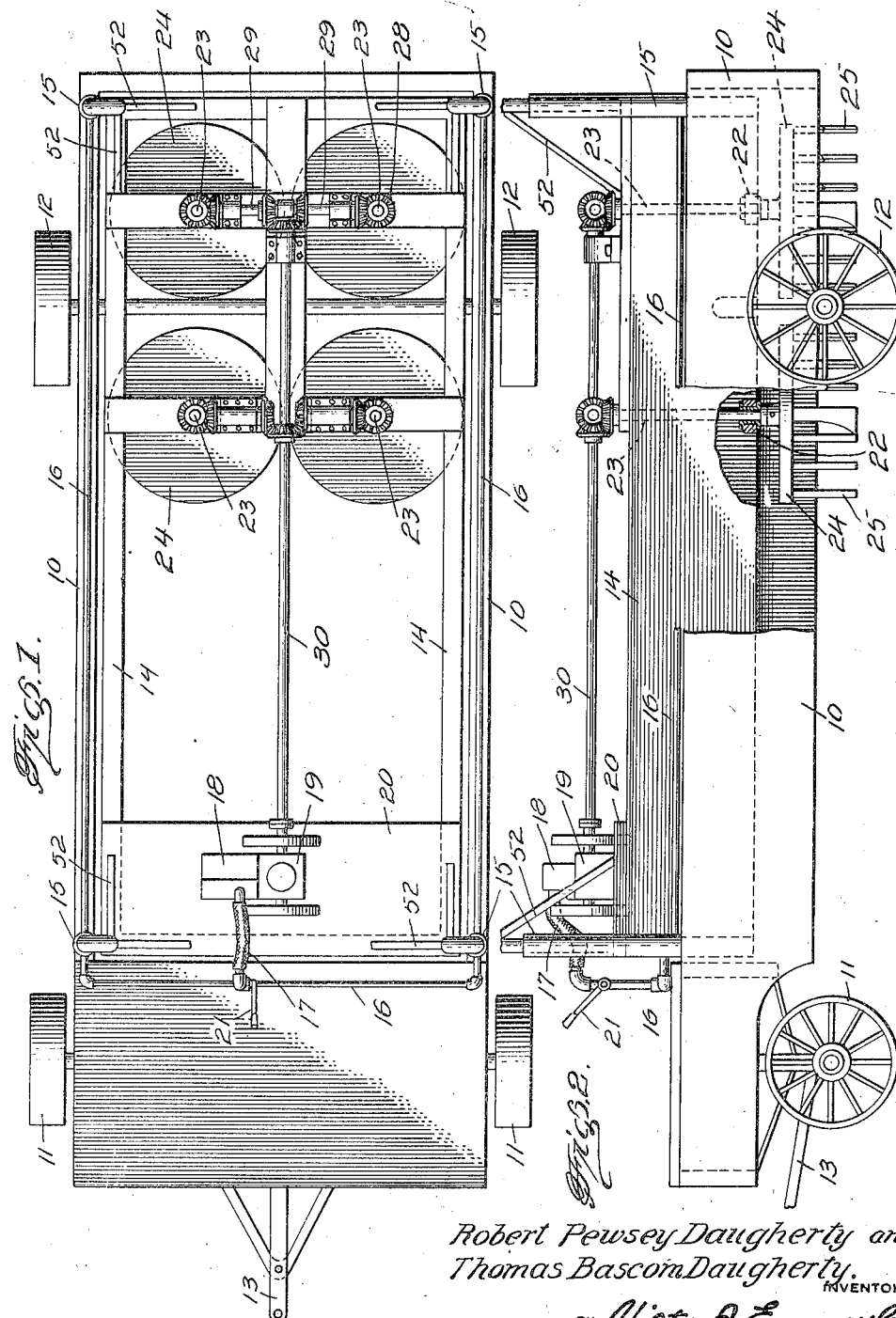

Robert Pawsey Daugherty and
Thomas Bascom Daugherty
INVENTOR

BY Victor J. Evans & Co.
ATTORNEYS

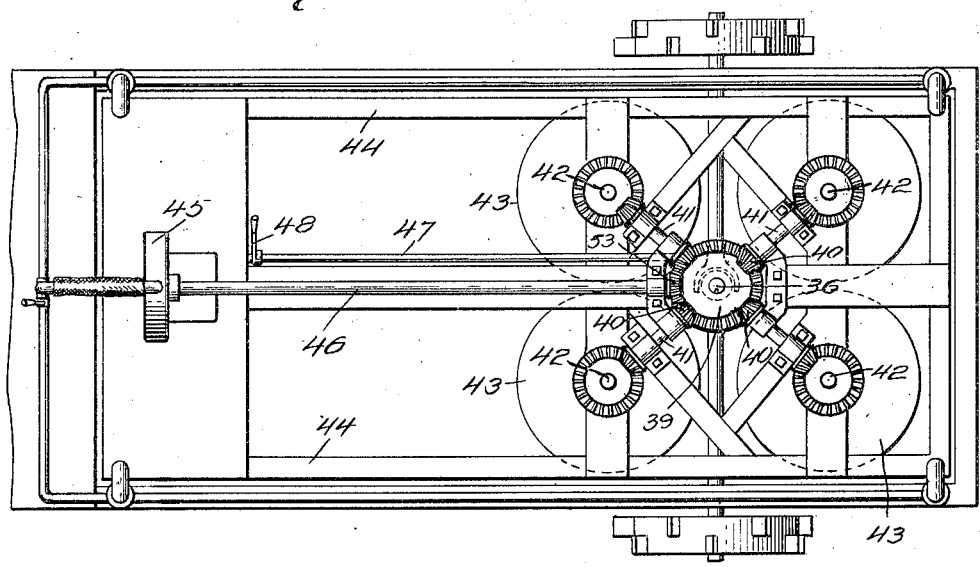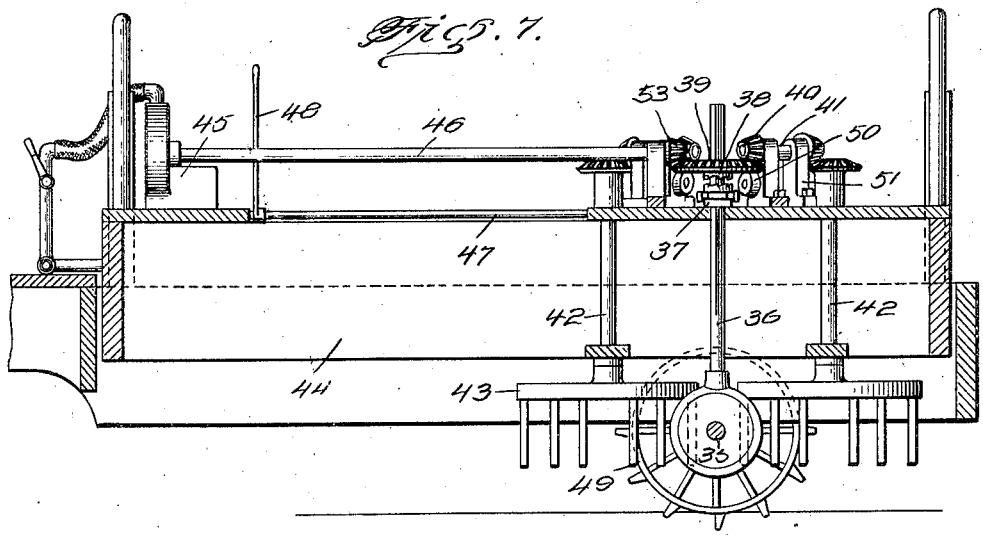

Patented Mar. 8, 1938

2,110,790

UNITED STATES PATENT OFFICE 2,110,790

GROUND PULVERIZING MACHINE

Robert Pewsey Daugherty and Thomas Bascom Daugherty, Guthrie, Okla.

Application December 18, 1936, Serial No. 116,622

4 Claims. (Cl. 97—43)

The invention relates to a soil working machine and more especially to ground pulverizing machines.

The primary object of the invention is the provision of a machine of this character, wherein through revolving cutters the soil or earth can be worked for the pulverizing thereof and in this manner conditioning the soil for planting purposes, the machine being of novel construction and enables the pulverizing of the soil with thoroughness and dispatch.

Another object of the invention is the provision of a machine of this character, wherein the earth or soil cutting members may be driven either from one of the wheels of the vehicle or from a motor carried by such vehicle.

A further object of the invention is the provision of a machine of this character, wherein the ground working elements are supported by a frame susceptible of being raised and lowered so that such elements can be brought into position with respect to the ground for deep working thereof or raised clear of the ground to be inactive thereon.

A further object of the invention is the provision of a machine of this character, wherein the raising and lowering of the ground working elements is effected in a novel manner and when these elements are in working position will thoroughly and deeply pulverize the soil for conditioning the same for planting purposes.

A still further object of the invention is the provision of a machine of this character, which is comparatively simple in construction, thoroughly reliable and effective in operation, readily and easily handled, enabling the pulverizing of the earth to be carried forth with dispatch and inexpensive to manufacture.

With these and other objects in view, the invention consists in the features of construction, combination and arrangement of parts as will be hereinafter more fully described, illustrated in the accompanying drawings, which discloses the preferred embodiment of the invention and pointed out in the claims hereunto appended.

In the accompanying drawings:

Figure 1 is a top plan view of a machine constructed in accordance with the invention.

Figure 2 is a side elevation thereof and partly broken away.

Figure 6 is a view similar to Figure 1 showing a modification of the machine.

Figure 7 is a vertical longitudinal sectional view thereof.

Similar reference characters indicate corresponding parts throughout the several views in the drawings.

Figure 3:
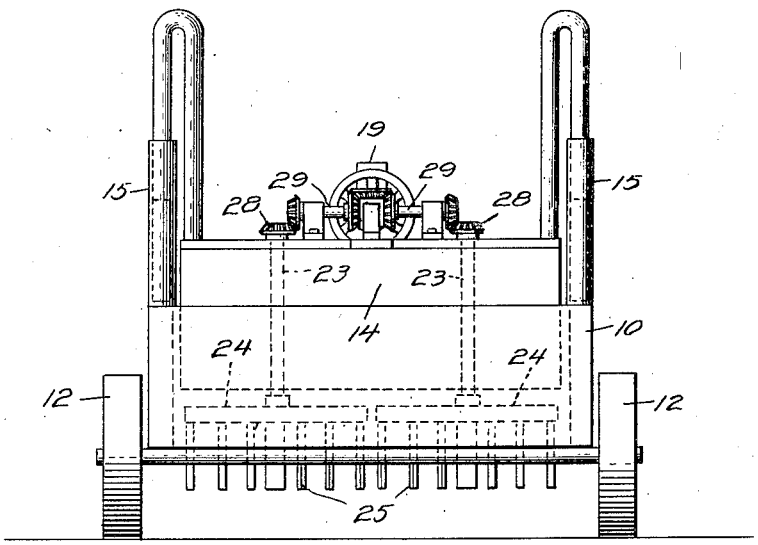
Figure 3 is a rear end view.
Figure 4:
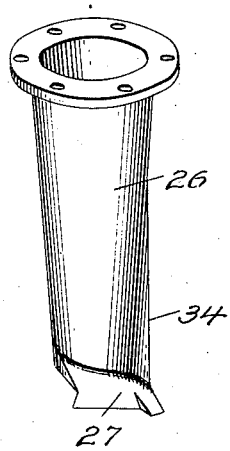
Figure 4 is a perspective view of one of the ground working teeth.

Referring to the drawings in detail, particularly Figures 1 to 4 inclusive, the machine comprises a vehicle body frame 10 equipped with front and rear wheels 11 and 12, respectively, while draft of this wheeled vehicle is had at the front end thereof through a draft rigging 13, the front wheels being arranged for the steering of the vehicle in the travel thereof when under draft.

Arranged within the frame 10 is an inner vertical adjustable auxiliary frame 14 while located fore and aft on the sectional frame 10 are fluid actuated raising and lowering jacks 15 which have connection with the frame 14 and the fluid for actuating the said jacks is conveyed to and from the same by a conduit 16 including a flexible connection 17 between it and a pump, compressor or the equivalent 18 operated from a motor 19 carried upon a rest 20 built in the frame 14. The conduit 16 has arranged therein a fluid control valve device 21 which is manually operated so that the jacks 15 can function for the raising and lowering of the frame 14 relative to the frame 10.

Journaled in the frame 14, preferably in the supports 22 arranged within this frame, are the vertical center shafts 23 of rotatable disk-like front and rear pairs of heads 24 which are fixed to the lower ends of said shafts 23 and have fixed to their bottom faces spaced perpendicular ground working teeth 25 which are arranged in a circular row on each head 24 and centrally of each head 24 and depending from its bottom face is a ground auger 26 having the cutting tip 27 and this auger coacts with the teeth 25 when the latter with the said auger are brought into engagement with the ground for the working of the same and the pulverizing thereof when the machine is advanced.

The shafts 23 through the gearing 28 and the stud shafting 29 have connection with a power shaft 30 driven by the motor 19 and in this manner the heads 24 of the pairs are rotated. The teeth 25 with the auger 26 are brought into engagement with the ground by actuating the jacks 15 for the lowering of the frame 14 within the frame 10 and the rotation of the heads 24 will cause the teeth 25 and the auger 26 to operate on the earth or soil for the pulverizing of the same.

Figure 5:
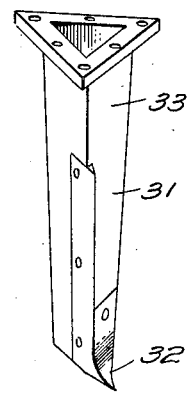
Figure 5 is a view similar to Figure 4 showing a slight modification.

In Figure 5 of the drawings there is shown a modification of auger 31 having the flat sides tapering in the direction of a tip 32 constituting a cutter and one of these flat sides has fitted thereto a blade 33, the auger 31 being preferably of triangular shape in cross section and is designed as a substitute for the auger 26, which latter is of downwardly tapered tubular form and is provided with a blade formation 34 longitudinally thereof which is the equivalent to the blade 33 on the auger 31.

In Figures 6 and 7 of the drawings there is shown a modification of the machine, wherein power is taken from the rear axle 35 through a driven shaft 36 which has slidably splined or keyed thereto the member 37 of a clutch, the other companion member 38 of the latter is a part of a driven master gear 39 which is loose upon the shaft 36, the gear 39 being fixed to the said shaft 36 when the member 37 engages the member 38 of this clutch. The gear 39 through the gearing 40 and shafting 41, respectively, operates the vertical shaft 42 of the rotatable heads 43, these being similar to the heads 24 and when rotated function for pulverizing the earth or soil.

The frame 44 which is vertically adjustable in the vehicle frame carries a pump 45 which is driven from the shaft 46 geared to the shaft 36 through the gear 39. The pump 45 functions similarly to the pump or the equivalent 18 for effecting the raising and lowering of the frame 44.

The clutch member 37 is operated from a hand throw device 47 carried by the frame 44, the handle or lever of the said device 47 being indicated at 48. Thus it will be seen that the heads 43 are rotated and driven from power derived from the axle 35 fitted with the rear wheels 49 of the vehicle when said wheels travel over the ground surface.

The member 37 of the clutch by its slidable connection with the shaft 36 allows for vertical adjustment of the frame 44 without interference thereto and the gear 39 loose on this shaft 36 is supported upon guide rollers 50, these being journaled in certain of the bearings for the shafting 41 as carried by the frame 44, the bearings being indicated at 51.

The jacks 15 are rigidly held in upright position by suitable braces 52 made fast thereto and also to the frame 14 in proximity to said jacks.

When the machine is drawn over the ground and the frame 14 or 44 lowered with the pulverizing elements working, the earth or soil will be broken up and pulverized with dispatch thus conditioning the ground for planting purposes.

The connection between the gear 39 and the shaft 46 is indicated at 53. The members 37 and 38 of the clutch are engaged and disengaged by the device 47 when manually actuated.

What is claimed is:

1. In a machine of the character described, a wheeled frame, an auxiliary inner frame mounted for vertical adjustment therein, soil pulverizing mechanism supported by the inner auxiliary frame and including a plurality of horizontally disposed toothed rotatable heads, and fluid raising and lowering jacks mounted vertically on the wheeled frame and operatively connected with the auxiliary frame fore and aft thereof for effecting the raising and lowering of the latter relative to the said wheeled frame.

2. In a machine of the character described, a wheeled frame, an auxiliary inner frame mounted for vertical adjustment therein, soil pulverizing mechanism supported by the inner auxiliary frame and including a plurality of horizontally disposed toothed rotatable heads, fluid raising and lowering jacks mounted vertically on the wheeled frame and operatively connected with the auxiliary frame fore and aft thereof for effecting the raising and lowering of the latter relative to the said wheeled frame, and power means for the driving of the pulverizing mechanism.

3. In a machine of the character described, a wheeled frame, an auxiliary inner frame mounted for vertical adjustment therein, soil pulverizing mechanism supported by the inner auxiliary frame and including a plurality of horizontally disposed toothed rotatable heads, fluid raising and lowering jacks mounted vertically on the wheeled frame and operatively connected with the auxiliary frame fore and aft thereof for effecting the raising and lowering of the latter relative to the said wheeled frame, power means for the driving of the pulverizing mechanism, and means operated by the power means for rendering effective the fluid jacks.

4. In a machine of the character described, a wheeled frame, an auxiliary inner frame mounted for vertical adjustment therein, soil pulverizing mechanism supported by the inner auxiliary frame and including a plurality of horizontally disposed toothed rotatable heads, fluid raising and lowering jacks mounted vertically on the wheeled frame and operatively connected with the auxiliary frame fore and aft thereof for effecting the raising and lowering of the latter relative to the said wheeled frame, power means for the driving of the pulverizing mechanism, means operated by the power means for rendering effective the fluid jacks, and a hand control for the fluid jacks.

ROBERT PEWSEY DAUGHERTY.
THOMAS BASCOM DAUGHERTY.